United States Patent

[11] 3,590,980

[72] Inventor Bengt Lennart Bengtsson
 Sperlingevagen 11, 260 36, Hittarp, Sweden
[21] Appl. No. 825,888
[22] Filed May 19, 1969
[45] Patented July 6, 1971
[32] Priority May 22, 1968
[33] Sweden
[31] 6944/68

[54] CONVEYER BELT SUPPORTS
 2 Claims, 2 Drawing Figs.
[52] U.S. Cl. ..................................... 198/57,
 198/184, 198/191
[51] Int. Cl. ....................................... B65g 47/18
[50] Field of Search .......................... 198/52, 54,
 56, 57, 184, 193, 58, 191, 201, 204

[56] References Cited
UNITED STATES PATENTS
| 2,973,083 | 2/1961 | Booth | 198/184 |
| 3,082,857 | 3/1963 | Holloman | 198/57 |
| 3,319,767 | 5/1967 | Breternitz et al. | 198/184 |

FOREIGN PATENTS
| 1,169,367 | 4/1964 | Germany | 198/184 |

Primary Examiner—Joseph Wegbreit
Assistant Examiner—Hadd S. Lane
Attorneys—Ralph E. Bucknam, Jesse D. Reingold, Robert R. Strack and Henry A. Marzullo, Jr.

ABSTRACT: In a belt conveyor where the belt consists of rubber or like material, that part of the conveyor belt where the material to be conveyed is dropped onto the belt, is supported by a mat of elastic material to prevent damage to the belt, the mat being secured outside the edges of the conveyor belt.

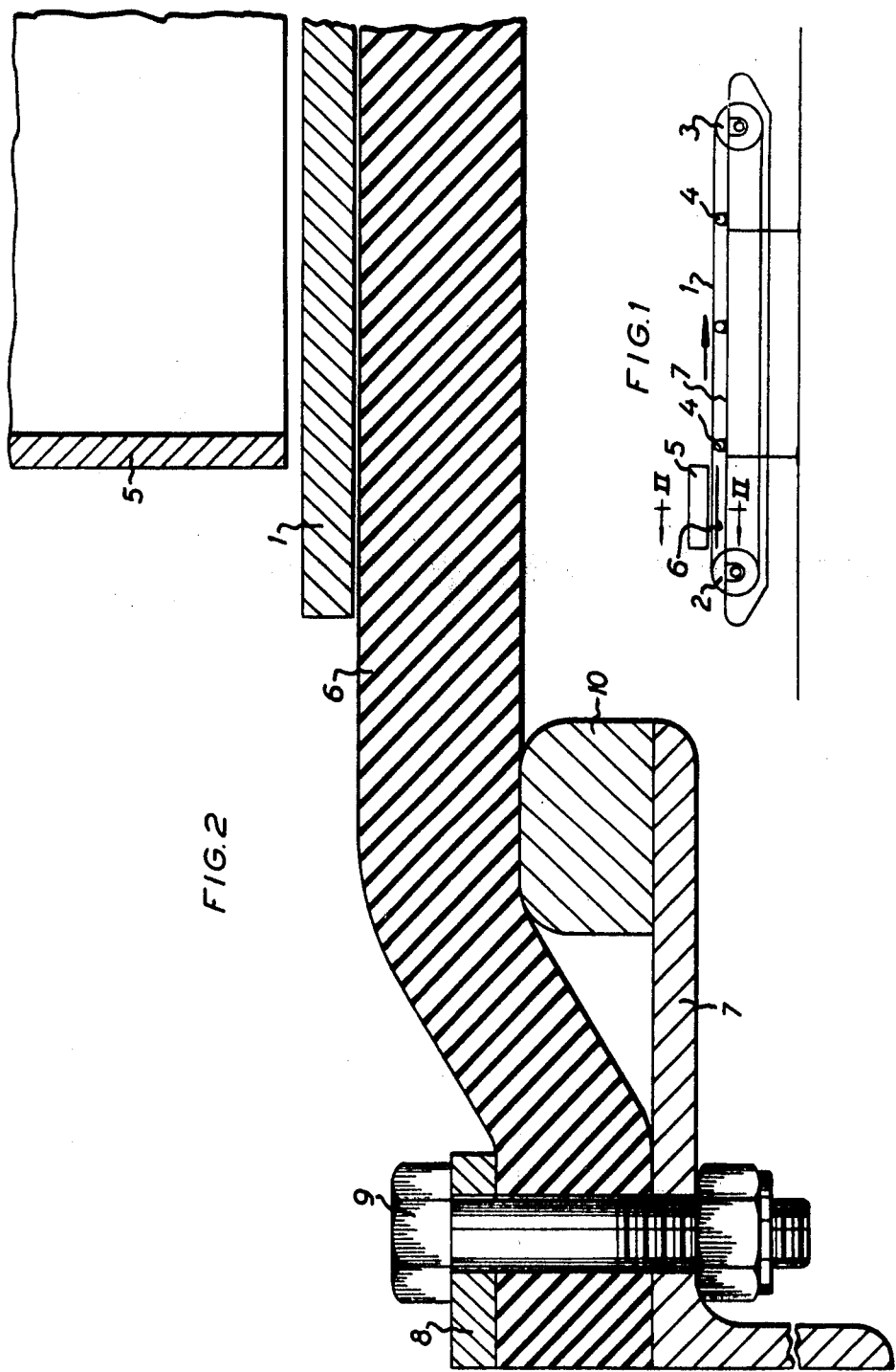

CONVEYER BELT SUPPORTS

This invention relates to belt conveyors especially such conveyors where the belt consists of rubber or like material.

Conveyor belts are usually supported by rollers which are mounted in the conveyor frame, and these rollers are especially closely spaced beneath that part of the conveyor belt where the material to be conveyed is delivered to the belt, usually by letting it drop onto the belt. In this manner, the belt is damaged to a higher or lesser degree, and if the material to be conveyed is unscreened gravel or other coarse material, the belt can be destroyed in a short time, even if the rollers are rubber-coated.

The invention has for its object to provide an improvement in this respect, and to this end the conveyor belt support consists of a mat of elastic material secured outside the edges of the conveyor belt.

A preferred embodiment of the invention will now be described in the following with reference to the accompanying drawing wherein:

FIG. 1 is a diagrammatic lateral view of a belt conveyor on a small scale;

FIG. 2 is a partial cross section along line II—II in FIG. 1 on a considerably larger scale.

The drawing illustrates a conveyor having a conveyor belt 1 of rubber or like material which extends around a pair of guide pulleys 2 and 3 in the direction indicated by an arrow, the upper part of said belt, which carries the material to be conveyed, being supported by a number of rollers 4 mounted in the conveyor frame.

At its feed end the conveyor has a feed box 5 within which the material is delivered onto the belt 1, and beneath this feed box the conveyor has a heavy mat 6 which serves to support the belt and outside the lateral edges of the belt 1 is secured to a pair of longitudinal beams 7 in the conveyor frame by means of a pair of flats 8 and screws 9, said mat resting upon a pair of rounded support rails 10 on the beams 7.

The mat is made of rubber and may be reinforced with inserts of e.g. textile material which, however, must be so designed that the mat will retain some of its elasticity and thus can yield to a suitable degree when the conveyor belt is pushed down towards the mat by the material dropping onto the belt. In this manner, the impacts are smoothly and uniformly distributed and absorbed, thereby sparing the conveyor belt. Experiments have shown that the life of a conveyor belt can be increased considerably if a mat of this type is used instead of rubber-coated rollers.

In the drawing, a small clearance is provided between the belt 1 and the mat 6, i.e. the mat is suspended at such a level that it is not contacted by the belt when the latter carries no or only a slight load. In this manner, friction between the belt and the mat will be avoided, at least during idling and in many cases also periodically during operation. Moreover, air can enter through the clearance and cool the upper side of the mat so that overheating is avoided. Naturally, it is also possible to give a smooth finish at least to the upper side of the mat by some suitable treatment or coating so that the friction will be reduced to a minimum.

What I claim and desire to secure by Letters Patent is:

1. A belt conveyor comprising a frame, guide pulleys mounted in said frame, an endless belt travelling around said guide pulleys, a loading station for delivering material to be conveyed onto the belt, a mat of elastic material disposed beneath said loading station and said belt and adapted to support said belt during loading operation, and means located outwardly of the longitudinal edges of said belt for suspending said mat underneath said belt such that the section of said mat underlying said belt is free of underlying support.

2. A belt conveyor according to claim 1, wherein said mat is suspended at an elevation such that said mat is spaced from said belt during nonloading operation of said belt conveyor, and said belt is adapted to contact said mat during loading operation of said belt conveyor.